United States Patent
Vangpat et al.

(10) Patent No.: US 8,844,013 B2
(45) Date of Patent: Sep. 23, 2014

(54) PROVIDING THIRD PARTY AUTHENTICATION IN AN ON-DEMAND SERVICE ENVIRONMENT

(71) Applicant: salesforce.com, inc., San Francisco, CA (US)

(72) Inventors: Alan Vangpat, Pittsburgh, PA (US); Prathima Rao, San Francisco, CA (US); Charles Mortimore, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 46 days.

(21) Appl. No.: 13/633,521

(22) Filed: Oct. 2, 2012

(65) Prior Publication Data

US 2013/0086670 A1    Apr. 4, 2013

Related U.S. Application Data

(60) Provisional application No. 61/543,141, filed on Oct. 4, 2011.

(51) Int. Cl.

| G06F 17/30 | (2006.01) |
|---|---|
| G06F 21/00 | (2013.01) |
| H04L 9/32 | (2006.01) |
| H04L 29/06 | (2006.01) |
| G06F 21/41 | (2013.01) |
| G06F 15/16 | (2006.01) |

(52) U.S. Cl.
CPC .......... *H04L 9/3213* (2013.01); *H04L 63/0815* (2013.01); *H04L 63/102* (2013.01); *G06F 21/41* (2013.01)

USPC ................................................ 726/8; 713/185

(58) Field of Classification Search
CPC .... G06F 21/41; G06F 21/604; H04L 63/0815; H04L 67/306
See application file for complete search history.

(56) References Cited

U.S. PATENT DOCUMENTS

| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |

(Continued)

OTHER PUBLICATIONS

"Facebook Across the Web" by Mark Zuckerberg, dated Dec. 4, 2008. Retrieved from the Internet at http://www.facebook.com/blog/blog.php?post=41735647130 on Apr. 3, 2012.

(Continued)

*Primary Examiner* — Dede Zecher
*Assistant Examiner* — Trang Doan
(74) *Attorney, Agent, or Firm* — Ingrassia Fisher & Lorenz, P.C.

(57) ABSTRACT

A method for logging a user into an online host system begins by receiving a login request from a web browser application of a client device, wherein the login request identifies the online host system. The method continues by initiating a single sign-on routine that involves an online third party system and by obtaining third party user data from the online third party system, wherein the obtained third party user data is associated with the user and is maintained by the online third party system. Host system records maintained by the online host system are modified in accordance with the obtained third party user data. Thereafter, the user is automatically logged into the online host system.

18 Claims, 5 Drawing Sheets

(56) References Cited

U.S. PATENT DOCUMENTS

| | | | |
|---|---|---|---|
| 5,761,419 A | 6/1998 | Schwartz et al. | |
| 5,819,038 A | 10/1998 | Carleton et al. | |
| 5,821,937 A | 10/1998 | Tonelli et al. | |
| 5,831,610 A | 11/1998 | Tonelli et al. | |
| 5,873,096 A | 2/1999 | Lim et al. | |
| 5,918,159 A | 6/1999 | Fomukong et al. | |
| 5,963,953 A | 10/1999 | Cram et al. | |
| 6,092,083 A | 7/2000 | Brodersen et al. | |
| 6,169,534 B1 | 1/2001 | Raffel et al. | |
| 6,178,425 B1 | 1/2001 | Brodersen et al. | |
| 6,189,011 B1 | 2/2001 | Lim et al. | |
| 6,216,135 B1 | 4/2001 | Brodersen et al. | |
| 6,233,617 B1 | 5/2001 | Rothwein et al. | |
| 6,266,669 B1 | 7/2001 | Brodersen et al. | |
| 6,295,530 B1 | 9/2001 | Ritchie et al. | |
| 6,324,568 B1 | 11/2001 | Diec et al. | |
| 6,324,693 B1 | 11/2001 | Brodersen et al. | |
| 6,336,137 B1 | 1/2002 | Lee et al. | |
| D454,139 S | 3/2002 | Feldcamp et al. | |
| 6,367,077 B1 | 4/2002 | Brodersen et al. | |
| 6,393,605 B1 | 5/2002 | Loomans | |
| 6,405,220 B1 | 6/2002 | Brodersen et al. | |
| 6,434,550 B1 | 8/2002 | Warner et al. | |
| 6,446,089 B1 | 9/2002 | Brodersen et al. | |
| 6,535,909 B1 | 3/2003 | Rust | |
| 6,549,908 B1 | 4/2003 | Loomans | |
| 6,553,563 B2 | 4/2003 | Ambrose et al. | |
| 6,560,461 B1 | 5/2003 | Fomukong et al. | |
| 6,574,635 B2 | 6/2003 | Stauber et al. | |
| 6,577,726 B1 | 6/2003 | Huang et al. | |
| 6,601,087 B1 | 7/2003 | Zhu et al. | |
| 6,604,117 B2 | 8/2003 | Lim et al. | |
| 6,604,128 B2 | 8/2003 | Diec | |
| 6,609,150 B2 | 8/2003 | Lee et al. | |
| 6,621,834 B1 | 9/2003 | Scherpbier et al. | |
| 6,654,032 B1 | 11/2003 | Zhu et al. | |
| 6,665,648 B2 | 12/2003 | Brodersen et al. | |
| 6,665,655 B1 | 12/2003 | Warner et al. | |
| 6,684,438 B2 | 2/2004 | Brodersen et al. | |
| 6,711,565 B1 | 3/2004 | Subramaniam et al. | |
| 6,724,399 B1 | 4/2004 | Katchour et al. | |
| 6,728,702 B1 | 4/2004 | Subramaniam et al. | |
| 6,728,960 B1 | 4/2004 | Loomans et al. | |
| 6,732,095 B1 | 5/2004 | Warshavsky et al. | |
| 6,732,100 B1 | 5/2004 | Brodersen et al. | |
| 6,732,111 B2 | 5/2004 | Brodersen et al. | |
| 6,754,681 B2 | 6/2004 | Brodersen et al. | |
| 6,763,351 B1 | 7/2004 | Subramaniam et al. | |
| 6,763,501 B1 | 7/2004 | Zhu et al. | |
| 6,768,904 B2 | 7/2004 | Kim | |
| 6,782,383 B2 | 8/2004 | Subramaniam et al. | |
| 6,804,330 B1 | 10/2004 | Jones et al. | |
| 6,826,565 B2 | 11/2004 | Ritchie et al. | |
| 6,826,582 B1 | 11/2004 | Chatterjee et al. | |
| 6,826,745 B2 | 11/2004 | Coker | |
| 6,829,655 B1 | 12/2004 | Huang et al. | |
| 6,842,748 B1 | 1/2005 | Warner et al. | |
| 6,850,895 B2 | 2/2005 | Brodersen et al. | |
| 6,850,949 B2 | 2/2005 | Warner et al. | |
| 7,003,305 B2* | 2/2006 | Urs | 455/466 |
| 7,340,411 B2 | 3/2008 | Cook | |
| 7,620,655 B2 | 11/2009 | Larsson et al. | |
| 7,698,160 B2 | 4/2010 | Beaven et al. | |
| 8,082,301 B2 | 12/2011 | Ahlgren et al. | |
| 8,095,413 B1 | 1/2012 | Beaven | |
| 8,095,594 B2 | 1/2012 | Beaven et al. | |
| 8,275,836 B2 | 9/2012 | Beaven et al. | |
| 8,438,635 B2* | 5/2013 | Das et al. | 726/18 |
| 2001/0044791 A1 | 11/2001 | Richter et al. | |
| 2002/0072951 A1 | 6/2002 | Lee et al. | |
| 2002/0082892 A1 | 6/2002 | Raffel | |
| 2002/0129352 A1 | 9/2002 | Brodersen et al. | |
| 2002/0140731 A1 | 10/2002 | Subramaniam et al. | |
| 2002/0143997 A1 | 10/2002 | Huang et al. | |
| 2002/0162090 A1 | 10/2002 | Parnell et al. | |
| 2002/0165742 A1 | 11/2002 | Robins | |
| 2003/0004971 A1 | 1/2003 | Gong | |
| 2003/0018705 A1 | 1/2003 | Chen et al. | |
| 2003/0018830 A1 | 1/2003 | Chen et al. | |
| 2003/0065956 A1* | 4/2003 | Belapurkar et al. | 713/202 |
| 2003/0066031 A1 | 4/2003 | Laane et al. | |
| 2003/0066032 A1 | 4/2003 | Ramachandran et al. | |
| 2003/0069936 A1 | 4/2003 | Warner et al. | |
| 2003/0070000 A1 | 4/2003 | Coker et al. | |
| 2003/0070004 A1 | 4/2003 | Mukundan et al. | |
| 2003/0070005 A1 | 4/2003 | Mukundan et al. | |
| 2003/0074418 A1 | 4/2003 | Coker et al. | |
| 2003/0120675 A1 | 6/2003 | Stauber et al. | |
| 2003/0151633 A1 | 8/2003 | George et al. | |
| 2003/0159136 A1 | 8/2003 | Huang et al. | |
| 2003/0187921 A1 | 10/2003 | Diec et al. | |
| 2003/0189600 A1 | 10/2003 | Gune et al. | |
| 2003/0204427 A1 | 10/2003 | Gune et al. | |
| 2003/0206192 A1 | 11/2003 | Chen et al. | |
| 2003/0225730 A1 | 12/2003 | Warner et al. | |
| 2003/0233404 A1 | 12/2003 | Hopkins | |
| 2004/0001092 A1 | 1/2004 | Rothwein et al. | |
| 2004/0010489 A1 | 1/2004 | Rio et al. | |
| 2004/0015981 A1 | 1/2004 | Coker et al. | |
| 2004/0027388 A1 | 2/2004 | Berg et al. | |
| 2004/0128001 A1 | 7/2004 | Levin et al. | |
| 2004/0186860 A1 | 9/2004 | Lee et al. | |
| 2004/0193510 A1 | 9/2004 | Catahan et al. | |
| 2004/0199489 A1 | 10/2004 | Barnes-Leon et al. | |
| 2004/0199536 A1 | 10/2004 | Barnes Leon et al. | |
| 2004/0199543 A1 | 10/2004 | Braud et al. | |
| 2004/0210909 A1 | 10/2004 | Dominguez, Jr. et al. | |
| 2004/0249854 A1 | 12/2004 | Barnes-Leon et al. | |
| 2004/0260534 A1 | 12/2004 | Pak et al. | |
| 2004/0260659 A1 | 12/2004 | Chan et al. | |
| 2004/0268299 A1 | 12/2004 | Lei et al. | |
| 2005/0050555 A1 | 3/2005 | Exley et al. | |
| 2005/0065925 A1 | 3/2005 | Weissman et al. | |
| 2005/0091098 A1 | 4/2005 | Brodersen et al. | |
| 2005/0144463 A1* | 6/2005 | Rossebo et al. | 713/185 |
| 2005/0223022 A1 | 10/2005 | Weissman et al. | |
| 2005/0283478 A1 | 12/2005 | Choi et al. | |
| 2006/0021019 A1* | 1/2006 | Hinton et al. | 726/10 |
| 2006/0206834 A1 | 9/2006 | Fisher et al. | |
| 2007/0115927 A1* | 5/2007 | Pearson | 370/352 |
| 2009/0119763 A1* | 5/2009 | Park et al. | 726/8 |
| 2010/0064355 A1* | 3/2010 | Toomey et al. | 726/5 |
| 2011/0277027 A1* | 11/2011 | Hayton et al. | 726/8 |
| 2011/0307948 A1* | 12/2011 | Ranjan et al. | 726/9 |
| 2012/0179646 A1* | 7/2012 | Hinton et al. | 707/607 |
| 2012/0291114 A1* | 11/2012 | Poliashenko et al. | 726/8 |
| 2013/0060929 A1* | 3/2013 | Koponen et al. | 709/224 |

OTHER PUBLICATIONS

"Login with Facebook," dated 2012. Retrieved from the Internet at http://www.facebook.com/help/?page=229348490415842 on Apr. 3, 2012.

"Announcing Facebook Connect" by Dave Morin, dated May 9, 2008. Retrieved from the Internet at http://developers.facebook.com/blog/post/2008/05/09/announcing-facebook-connect/ on Sep. 28, 2012.

* cited by examiner

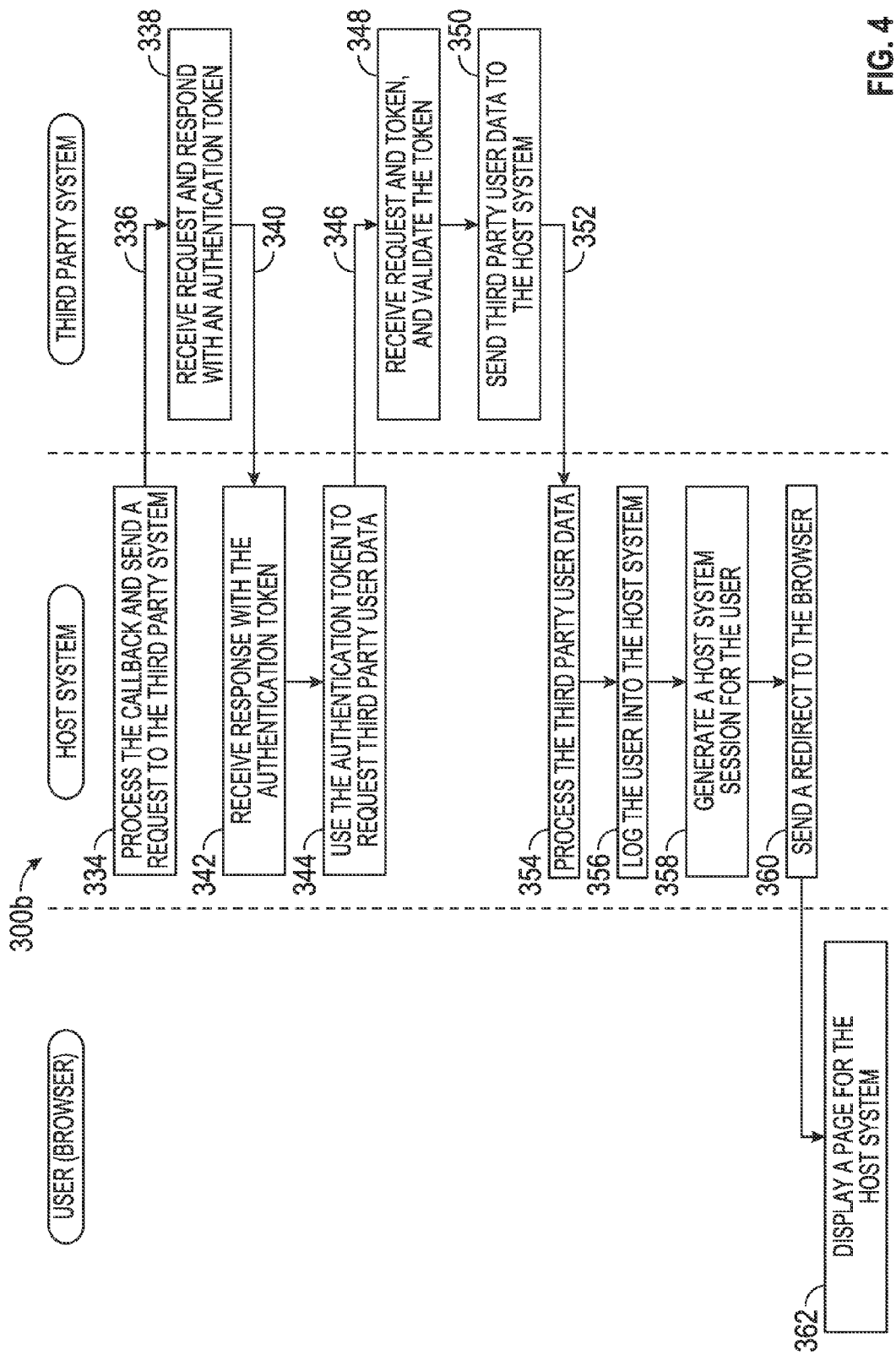

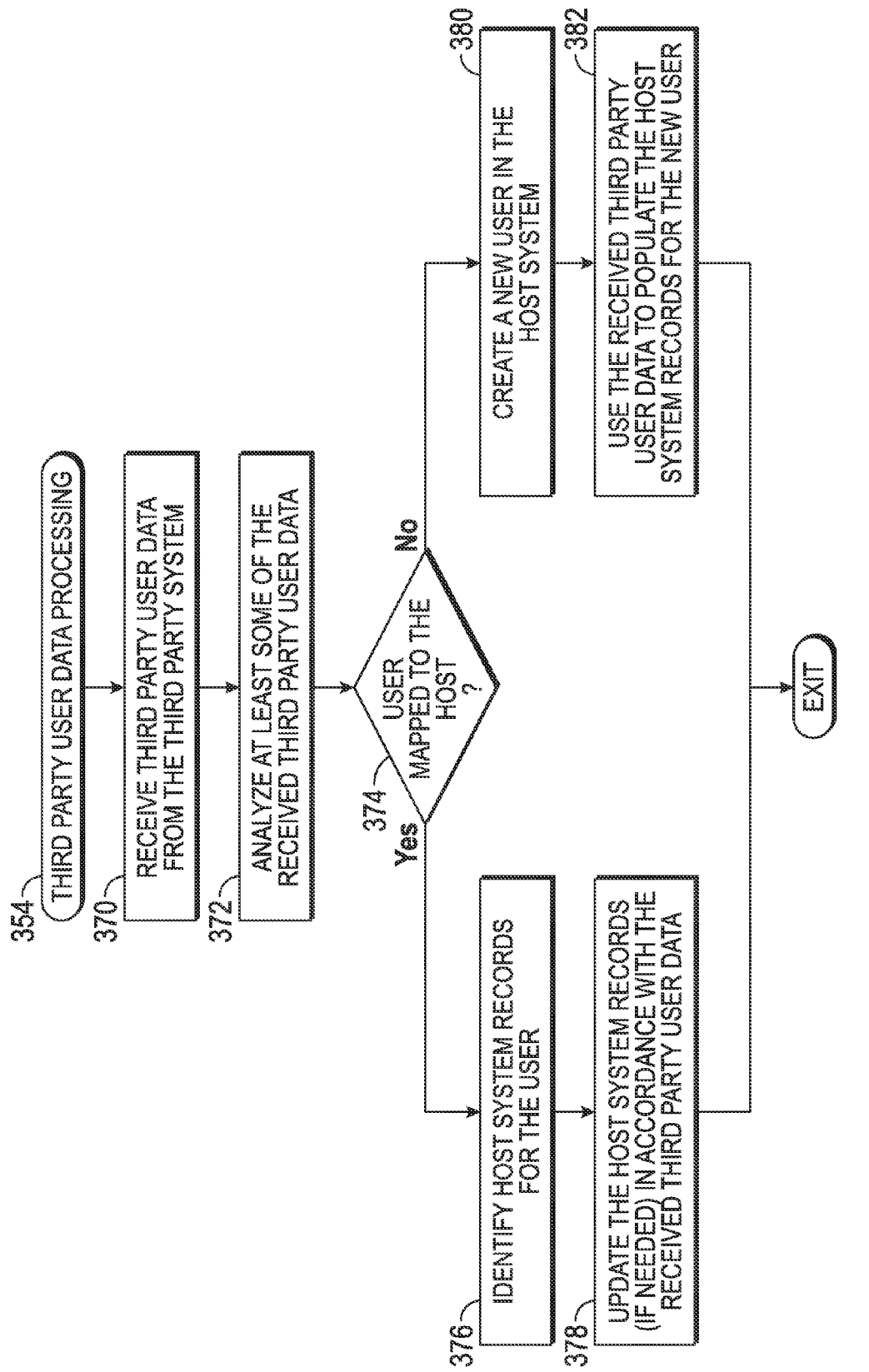

PROVIDING THIRD PARTY AUTHENTICATION IN AN ON-DEMAND SERVICE ENVIRONMENT

CROSS-REFERENCE TO RELATED APPLICATION

This application claims the benefit of U.S. provisional patent application Ser. No. 61/543,141, filed Oct. 4, 2011, the content of which is incorporated by reference herein.

TECHNICAL FIELD

Embodiments of the subject matter described herein relate generally to computer systems, communication networks, and related authentication procedures. More particularly, embodiments of the subject matter relate to authentication and login procedures for users of websites.

BACKGROUND

Many users of the Internet interact with web-based email applications, online services, social networking sites, and other websites that require login credentials. For example, many users maintain multiple email accounts with different providers, multiple social networking accounts, etc. A "power user" may have different user credentials for many different websites, and keeping track of the user credentials can be cumbersome and frustrating. Some existing websites may have partnership arrangements with other websites that allow multiple websites to share the same user credentials for purposes of logging in a user.

Furthermore, modern software development is evolving away from the client-server model toward network-based processing systems that provide access to data and services via the Internet or other networks. In contrast to traditional systems that host networked applications on dedicated server hardware, a "cloud" computing model allows applications to be provided over the network "as a service" supplied by an infrastructure provider. The infrastructure provider typically abstracts the underlying hardware and other resources used to deliver a customer-developed application so that the customer no longer needs to operate and support dedicated server hardware. The cloud computing model can often provide substantial cost savings to the customer over the life of the application because the customer no longer needs to provide dedicated network infrastructure, electrical and temperature controls, physical security and other logistics in support of dedicated server hardware.

Accordingly, the same user might have a set of credentials for logging into a social networking website, another set of credentials for logging into a cloud-based application or service, and other sets of credentials for logging into other websites, services, applications, and the like. Unfortunately, many individual websites have not yet deployed any form of true single sign-on (SSO) functionality that allows end users to effectively use user credentials for different websites in a seamless and transparent manner.

Accordingly, it is desirable to have an efficient and effective methodology for providing SSO across a website and a cloud-based application or service. Furthermore, other desirable features and characteristics will become apparent from the subsequent detailed description and the appended claims, taken in conjunction with the accompanying drawings and the foregoing technical field and background.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

FIG. 4 is a flow chart that illustrates an embodiment of a follow-on portion of an authentication process that involves a client device, a host system, and a third party system; and FIG. 5 is a flow chart that illustrates an embodiment of third party user data processing, which may take place during the follow-on portion of the authentication process shown in FIG. 4.

DETAILED DESCRIPTION

Figure 1:
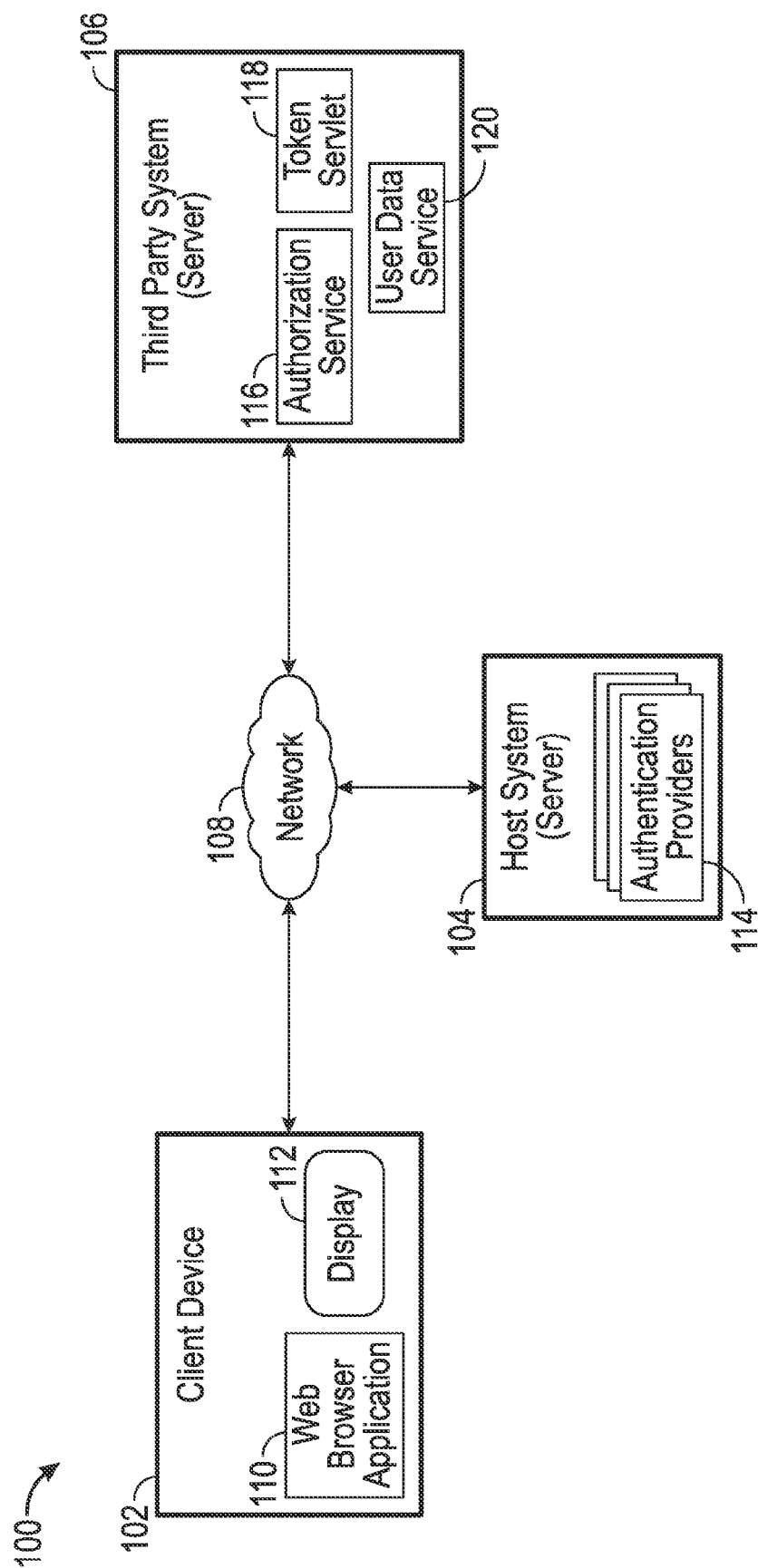
FIG. 1 is a schematic representation of an embodiment of a network-based system.

The exemplary embodiments presented here relate to various user authentication techniques, protocols, procedures, and technology. The described subject matter can be implemented in the context of any computer-implemented system, such as a software-based system, a database system, a multi-tenant environment, or the like. Moreover, the described subject matter could be implemented in connection with two or more separate and distinct computer-implemented systems that cooperate and communicate with one another.

In certain situations, a user of a client device may be visiting a website or hosted application maintained or provided by a third party system and want to access information maintained or provided by a host system (such as customer relationship management data maintained by a cloud-based application provided by SALESFORCE.COM). The framework described herein provides a mechanism for logging into a host system account (such as a SALESFORCE.COM account) via a third party account (such as a FACEBOOK account or a TWITTER account). In this way, a user is able to go to a uniform resource locator (URL) where they are redirected to the third party system, input their user credentials to log into the third party system, and be redirected to the host system to access the host system data. In addition, the framework presented herein allows for secure and automated user creation for the host system, and the framework can be suitably configured to support standard users of the host system and/or portal users of the host system.

In one implementation, the framework includes several modules or components. In this regard, the framework may include or support "authorization providers" that an administrator of the host system creates for each third party service to be supported (such as FACEBOOK or TWITTER). The creation of an authorization provider may include certain basic details such as a third party key and secret.

In addition, as part of the authorization providers, administrators are able to write an apex class that implements an "authorization registration handler" interface. This apex class can be used to create or update users that enter the defined SSO flow. The apex class is given a map of user attributes (such as the third party username, identifier, email address, first name, last name, etc.) and is told to either create and return a new user for the host system or update any existing user data objects as desired. In this manner, an apex handler can be written to create portal users (and the accompanying data objects, such as Contact and Account objects) or standard host system users, or to update fields on them (for example, setting the email address on the host system user based on an email address received from the third party system). In one implementation, to prevent login to random host system accounts, security measures are implemented to force new user creation for third party accounts that have not been seen before, and to store mappings for users. For further security, the apex class may be forced to return an uncreated user object, rather than creating a user and returning its identifier.

Furthermore, the apex class can be used to allow users to perform SSO into the host system by way of a third party account. This type of SSO may be accomplished by hitting a certain endpoint, which will ask the user to log into the third party system. This action uses the apex class to provision a user or update user details, depending on whether the third party user is already mapped to a user in the host system.

Moreover, existing users are provided with a flow to link third party accounts (because the SSO flow is only able to create new users for third party accounts that have not been seen). Accordingly, a user can enter this flow, log into the third party, log into the host system, and then confirm that they wish to link the accounts. This feature allows users that already have host system accounts to log into those accounts via a third party account.

In certain practical embodiments, the framework is implemented around the OAuth authorization protocol (and the framework uses OAuth to contact the third parties and obtain user details such as the first name and email address). As such, the host system stores the OAuth credentials (OAuth token and refresh token) such that other host system features can use them to query. An "authorization" flow may also be provided to allow a user to log into a third party, and then simply store the OAuth token and refresh token for use with other host system features.

In practice, the framework could be extended to allow complete customization such that an administrator of the host system can enable SSO from any third party service, as long as the service provides a "query" ability to obtain information such as username and user identifier.

Notably, the framework is distinguishable from existing approaches that allow a user to log into a host system as a user of a third party system, such that the host system can query the third party system using the third party credentials of the user for purposes of accessing data maintained by the third party system. Rather, the framework presented here represents an SSO mechanism for many third parties (such as JANRAIN or TWITTER), allows a user to sign into one tenant of a multi-tenant database system while accessing data maintained for another tenant of the multi-tenant database system, and allows automated provisioning of new users.

As one working example, after an administrator configures the framework to support a third party system such as FACEBOOK, a registered user of the FACEBOOK system can hit an endpoint of the host system (e.g., a specified URL in SALESFORCE.COM), which in turn directs that user to log into the FACEBOOK system. Upon doing so, the user is sent back to SALESFORCE.COM for access. If the user does not already have an account with SALESFORCE.COM, then the a new account will be created and the system will log the user into SALESFORCE.COM under the newly created account. Simply put, the framework described in more detail herein receives user authentication information for a third party site, and responds by authenticating the user (based on the received user authentication information) for access to the host system.

Turning now to the drawings, FIG. 1 is a schematic representation of an embodiment of a network-based system 100. Although certain embodiments described here relate to a web-based system, the techniques and methodologies can be utilized in other types of network arrangements. Moreover, the simplified system 100 shown and described here represents only one possible embodiment of a system for logging a user into an online host system in a manner that cooperates with an online third party system that is different than (and typically independent from) the online host system. The illustrated embodiment of the system 100 includes, without limitation: at least one client device 102; an online host system 104 (which may be alternatively referred to here as a host server); and an online third party system 106 (which may be alternatively referred to here as a third party server). The client device 102, the host system 104, and the third party system 106 are operatively coupled to each other through a data communication network 108. The system 100 is preferably realized as a computer-implemented system in that the client device 102, the host system 104, and the third party system 106 are configured as computer-based electronic devices.

Although FIG. 1 depicts only one client device 102, only one host system 104, and only one third party system 106, an embodiment of the system 100 could support any number of client devices, any number of host systems (associated with different entities, tenants, businesses, companies, organizations, etc.) and any number of third party systems (associated with different entities, tenants, businesses, companies, organizations, etc.). Each client device 102 supported by the system 100 may be implemented using any suitable hardware platform. In this regard, a client device 102 may be realized in any common form factor including, without limitation: a desktop computer; a mobile computer (e.g., a tablet computer, a laptop computer, or a netbook computer); a smartphone; a video game device; a digital media player; a piece of home entertainment equipment; or the like. Each client device 102 supported by the system 100 is realized as a computer-implemented or computer-based device having the hardware, software, firmware, and/or processing logic needed to carry out the processes described in more detail herein. For example, each client device 102 may include a respective web browser application 110 (having conventional web browser functionality) that facilitates the rendering of web pages, images, documents, and other visual content at a display element 112. The display element 112 may be incorporated into the client device 102 itself (for example, if the client device 102 is implemented as a tablet computer or a smartphone device), or it may be realized as a physically distinct component that is operatively coupled to the client device 102, as is well understood.

The system 100 may be deployed using any number of server infrastructures, web servers, computer devices, or architectures that are suitably configured to provide access to certain online resources, online data, and the like. As used herein, "online resources" may refer to a file, document, hosted application, online service (e.g., a social networking application or a cloud-based application), website, website domain, webpage, or item that can be accessed or retrieved via a network such as the Internet. The examples described here assume that the host system 104 and the third party system 106 include, support, or maintain online resources such as websites, web pages, or online services provided via websites or web pages, where the online resources and associated data require user credentials for access.

The third party system 106 is a "third party" relative to the host system 104. For the straightforward example described here, the host system 104 is associated with one company, business, or domain (e.g., COMPANY_ABC.COM), and the third party system 106 is associated with a different company, business, or domain (e.g., BUSINESS_123.COM). Alternatively, the host system 104 and the third party system 106 may each be associated with a different division or department of a company, a different subdomain, a different tenant supported by a multi-tenant database system, or the like. For example, a multi-tenant cloud-based service provider such as SALESFORCE.COM may support a plurality of different tenants or organizations, where one designated tenant can be considered to be the host system 104, and the remaining tenants can be considered to be third party systems relative to the host system 104.

The host system 104 is suitably configured to support the user authentication and sign-on techniques and methodologies described in more detail below. To this end, the host system 104 may be customizable and configurable to create, maintain, and support one or more authentication providers 114. In certain embodiments, the host system 104 creates one authentication provider 114 for each third party system 106 such that the various single sign-on and third party authentication techniques are supported. Each authentication provider 114 is responsible for carrying out the various tasks, processes, and procedures for the host system 104 (as described in more detail below). In practice, each authentication provider 114 may be implemented as a logical software module having suitable program instructions that are written to support a variety of authentication, sign-on, data processing, and data communication operations. For example, the functionality of each authentication provider 114 may be provided in the form of a non-transitory computer-readable storage medium that resides at the host system 104, where the computer-readable storage medium includes computer-executable instructions stored thereon. When executed, the instructions instruct one or more processors of the host system 104 to perform the various authentication tasks, processes, and methods described here.

The third party system 106 is also configured to support the user authentication and sign-on techniques and methodologies described in more detail below. To this end, the third party system 106 may be provisioned with various logical or software-implemented processing modules, including, without limitation: an authorization service module 116; a token servlet module 118; and a user data service module 120. Each of these modules and/or the third party system 106 as a whole is responsible for carrying out the various tasks, processes, and procedures that may be required to support the cross-system and single sign-on authentication techniques facilitated by the host system 104 (as described in more detail below).

The authorization service module 116 handles authorization, sign-on, login, and related functions on behalf of the third party system. For example, the authorization service module 116 may generate and provide an appropriate login page to prompt a user to enter his or her credentials for purposes of logging that user into the third party system 106. As described in more detail below, the authorization service module 116 may cooperate with certain features or functionality of the host system 104 to support a single sign-on methodology that involves the host system 104 and the third party system 106. In certain practical implementations, the authorization service module 116 utilizes the OAuth protocol.

The token servlet module 118 supports features and functionality related to the handling of security tokens for the third party system 106. For example, security tokens may be issued and utilized to ensure that data maintained by the third party system 106 can only be accessed by trusted and legitimate host systems. Thus, the token servlet module 118 may include a token creator that generates security tokens (e.g., OAuth tokens) to be used by the host system 104 for purposes of accessing third party user data maintained by the third party system 106. The particular characteristics, properties, parameters, and formatting of the tokens handled by the token servlet module 118 may vary from one embodiment to another, from one third party system to another, and/or from one host server system to another. Moreover, the different applications may specify different token use policies that apply to the security tokens handled by the applications. It should be appreciated that the system 100 could leverage any number of known, conventional, or standardized security token techniques, technologies, and protocols, which will not be described in detail here.

The user data service module 120 supports features and functionality related to the handling of user data (i.e., "third party user data"). The user data service module 120 may be responsible for collecting, saving, updating, and providing third party user data for any number of different users of the third party system 106. In certain practical embodiments, the user data service module 120 utilizes the OPEN GRAPH protocol, a user ID service, a login service, and/or other services or applications to maintain the third party user data and, when requested to do so by a trusted host system 104, provide third party user data to the host system 104. The third party user data may include any type of information that might be appropriate for the particular embodiment of the system. For example, the third party user data may include any or all of the following types of data, without limitation: profile information for the user; a username of the user; a password of the user; an image that represents the user; a name of the user; biographical information of the user; an email address of the user; a telephone number of the user; a physical address of the user; a facsimile number of the user; a location associated with the user; a title of the user; a department associated with the user; a company name associated with the user; the user's locale and language settings; endpoint URLs for retrieving additional information about the user; and information related to user access privileges.

The data communication network 108 provides and supports data connectivity between the client device 102, the host system 104, and the third party system 106 as needed. In practice, the data communication network 108 may be any digital or other communications network capable of transmitting messages or data between devices, systems, or components. In certain embodiments, the data communication network 108 includes a packet switched network that facilitates packet-based data communication, addressing, and data routing. The packet switched network could be, for example, a wide area network, the Internet, or the like. In various embodiments, the data communication network 108 includes any number of public or private data connections, links or network connections supporting any number of communications protocols. The data communication network 108 may include the Internet, for example, or any other network based upon TCP/IP or other conventional protocols. In various embodiments, the data communication network 108 could also incorporate a wireless and/or wired telephone network, such as a cellular communications network for communicating with mobile phones, personal digital assistants, and/or the like. The data communication network 108 may also incorporate any sort of wireless or wired local and/or personal area networks, such as one or more IEEE 802.3, IEEE 802.16, and/or IEEE 802.11 networks, and/or networks that implement a short range (e.g., Bluetooth) protocol.

In practice, the client device 102, the online host system 104, and the online third party system 106 in the system 100 are deployed as computer-based devices. Computing devices and their associated hardware, software, and processing capabilities are well known and will not be described in detail here. In this regard, the client device 102, the host system 104, and the third party system 106 may each include some or all of the following items, without limitation: at least one processor or processing architecture; a suitable amount of memory; device-specific hardware, software, firmware, and/or applications; a user interface; a communication module; a display element; and additional elements, components, modules, and functionality configured to support various features that are unrelated to the subject matter described here.

A processor used by a device in the system 100 may be implemented or performed with a general purpose processor, a content addressable memory, a digital signal processor, an application specific integrated circuit, a field programmable gate array, any suitable programmable logic device, discrete gate or transistor logic, discrete hardware components, or any combination designed to perform the functions described here. Moreover, a processor may be implemented as a combination of computing devices, e.g., a combination of a digital signal processor and a microprocessor, a plurality of microprocessors, one or more microprocessors in conjunction with a digital signal processor core, or any other such configuration.

Memory may be realized as RAM memory, flash memory, EPROM memory, EEPROM memory, registers, a hard disk, a removable disk, a CD-ROM, or any other form of storage medium known in the art. In this regard, the memory can be coupled to a processor such that the processor can read information from, and write information to, the memory. In the alternative, the memory may be integral to the processor. As an example, the processor and the memory may reside in an ASIC. The memory can be used to store computer-readable storage media, where a tangible and non-transient computer-readable medium has computer-executable instructions stored thereon. The computer-executable instructions, when read and executed by a processor, cause the device to perform certain tasks, operations, functions, and processes described in more detail herein. In this regard, the memory may represent one suitable implementation of such computer-readable media. Alternatively or additionally, the device could receive and cooperate with computer-readable media (not separately shown) that is realized as a portable or mobile component or platform, e.g., a portable hard drive, a USB flash drive, an optical disc, or the like.

A communication module used by a device in the system 100 facilitates data communication between the host device and other components as needed during the operation of the device. In the context of this description, a communication module can be employed during one or more data communication sessions that involve the client device 102, the host system 104, and the third party system 106. Moreover, a communication module of a device or system shown in FIG. 1 may support wireless data communication and/or wired data communication, using one or more data communication protocols.

The exemplary embodiments presented here relate to various computer-implemented and computer-executed techniques related to user authentication and sign-on techniques. The described subject matter could be implemented in connection with any suitable computer-based architecture, system, network, or environment, such as two or more user devices that communicate via a data communication network. Although the subject matter presented here could be utilized in connection with any type of computing environment, certain exemplary embodiments can be implemented in conjunction with a multi-tenant database environment.

Figure 2:
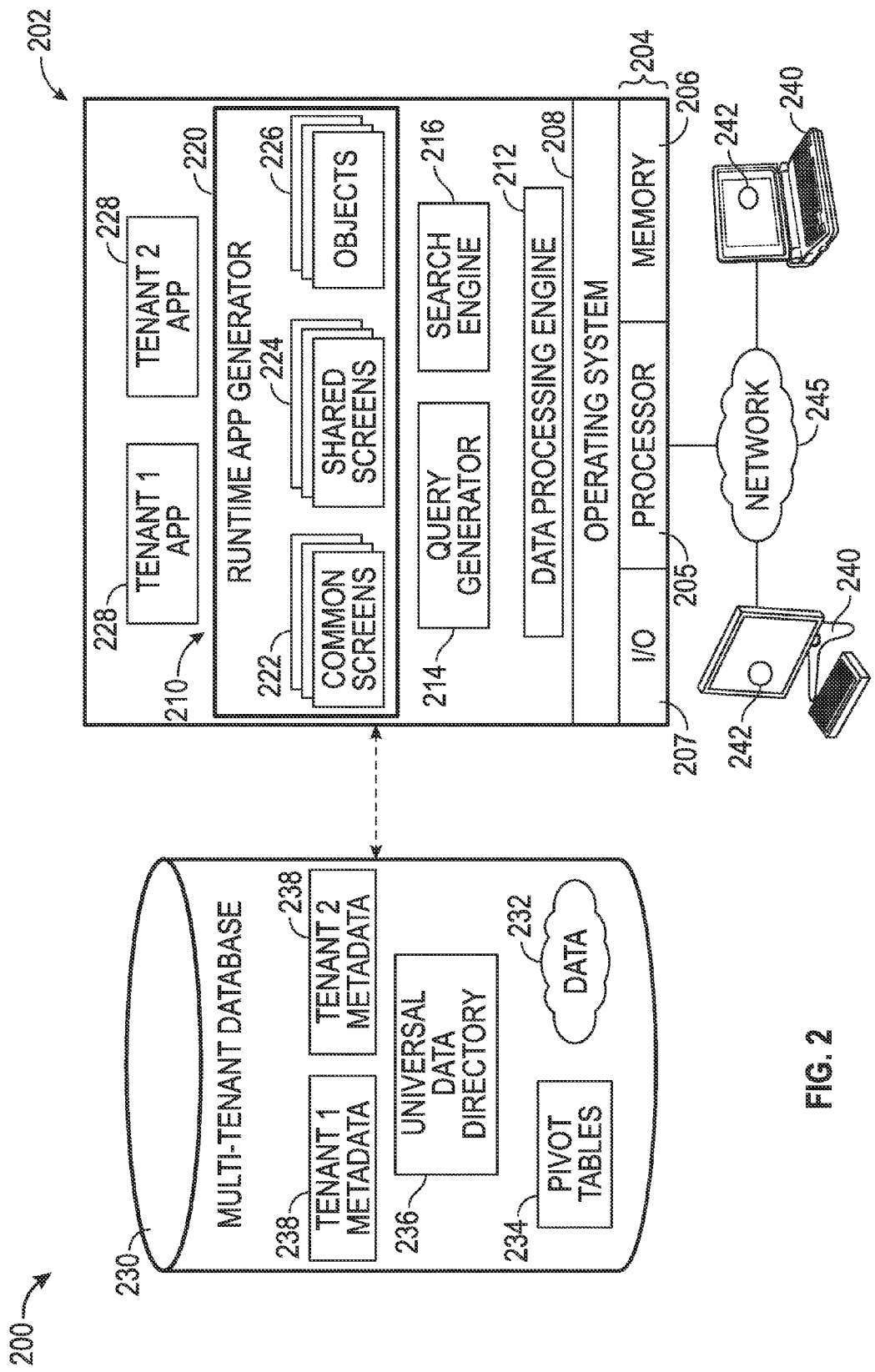
FIG. 2 is a schematic representation of an embodiment of a multi-tenant application system.

In this regard, an exemplary embodiment of a multi-tenant database system 200 is shown in FIG. 2. The system 200 suitably includes a server 202 that dynamically creates virtual applications 228 based upon data 232 from a common database 230 that is shared between multiple tenants. Referring again to FIG. 1, the host system 104 may include or be implemented as the server 202 as generally described here. Data and services generated by the virtual applications 228 are provided via a network 245 to any number of user devices 240, as desired. Each virtual application 228 is suitably generated at run-time using a common application platform 210 that securely provides access to the data 232 in the database 230 for each of the various tenants subscribing to the system 200. In accordance with one non-limiting example, the system 200 may be implemented in the form of a multi-tenant customer relationship management (CRM) system that can support any number of authenticated users of multiple tenants.

A "tenant" or an "organization" generally refers to a group of users that shares access to common data within the database 230. Tenants may represent customers, customer departments, business or legal organizations, and/or any other entities that maintain data for particular sets of users within the system 200. Although multiple tenants may share access to the server 202 and the database 230, the particular data and services provided from the server 202 to each tenant can be securely isolated from those provided to other tenants. The multi-tenant architecture therefore allows different sets of users to share functionality without necessarily sharing any of the data 232.

The database 230 is any sort of repository or other data storage system capable of storing and managing the data 232 associated with any number of tenants. The database 230 may be implemented using any type of conventional database server hardware. In various embodiments, the database 230 shares processing hardware 204 with the server 202. In other embodiments, the database 230 is implemented using separate physical and/or virtual database server hardware that communicates with the server 202 to perform the various functions described herein.

The data 232 may be organized and formatted in any manner to support the application platform 210. In various embodiments, the data 232 is suitably organized into a relatively small number of large data tables to maintain a semi-amorphous "heap"-type format. The data 232 can then be organized as needed for a particular virtual application 228. In various embodiments, conventional data relationships are established using any number of pivot tables 234 that establish indexing, uniqueness, relationships between entities, and/or other aspects of conventional database organization as desired.

Further data manipulation and report formatting is generally performed at run-time using a variety of metadata constructs. Metadata within a universal data directory (UDD) 236, for example, can be used to describe any number of forms, reports, workflows, user access privileges, business logic and other constructs that are common to multiple tenants. Tenant-specific formatting, functions and other constructs may be maintained as tenant-specific metadata 238 for each tenant, as desired. Rather than forcing the data 232 into an inflexible global structure that is common to all tenants and applications, the database 230 is organized to be relatively amorphous, with the pivot tables 234 and the metadata 238 providing additional structure on an as-needed basis. To that end, the application platform 210 suitably uses the pivot tables 234 and/or the metadata 238 to generate "virtual" components of the virtual applications 228 to logically obtain, process, and present the relatively amorphous data 232 from the database 230.

The server 202 is implemented using one or more actual and/or virtual computing systems that collectively provide the dynamic application platform 210 for generating the virtual applications 228. The server 202 operates with any sort of conventional processing hardware 204, such as a processor 205, memory 206, input/output features 207 and the like. The processor 205 may be implemented using one or more of microprocessors, microcontrollers, processing cores and/or other computing resources spread across any number of distributed or integrated systems, including any number of "cloud-based" or other virtual systems. The memory 206 represents any non-transitory short or long term storage capable of storing programming instructions for execution on the processor 205, including any sort of random access memory (RAM), read only memory (ROM), flash memory, magnetic or optical mass storage, and/or the like. The server 202 typically includes or cooperates with some type of computer-readable media, where a tangible computer-readable medium has computer-executable instructions stored thereon. The computer-executable instructions, when read and executed by the server 202, cause the server 202 to perform certain tasks, operations, functions, and processes described in more detail herein. In this regard, the memory 206 may represent one suitable implementation of such computer-readable media. Notably, the processor 205 and the memory 206 may be suitably configured to carry out the various login, single sign-on, and authentication operations described in more detail below.

The input/output features 207 represent conventional interfaces to networks (e.g., to the network 245, or any other local area, wide area or other network), mass storage, display devices, data entry devices and/or the like. In a typical embodiment, the application platform 210 gains access to processing resources, communications interfaces and other features of the processing hardware 204 using any sort of conventional or proprietary operating system 208. As noted above, the server 202 may be implemented using a cluster of actual and/or virtual servers operating in conjunction with each other, typically in association with conventional network communications, cluster management, load balancing and other features as appropriate.

The application platform 210 is any sort of software application or other data processing engine that generates the virtual applications 228 that provide data and/or services to the user devices 240. The virtual applications 228 are typically generated at run-time in response to queries received from the user devices 240. For the illustrated embodiment, the application platform 210 includes a bulk data processing engine 212, a query generator 214, a search engine 216 that provides text indexing and other search functionality, and a runtime application generator 220. Each of these features may be implemented as a separate process or other module, and many equivalent embodiments could include different and/or additional features, components or other modules as desired.

The runtime application generator 220 dynamically builds and executes the virtual applications 228 in response to specific requests received from the user devices 240. The virtual applications 228 created by tenants are typically constructed in accordance with the tenant-specific metadata 238, which describes the particular tables, reports, interfaces and/or other features of the particular application. In various embodiments, each virtual application 228 generates dynamic web content (including GUIs, detail views, secondary or sidebar views, and the like) that can be served to a browser or other client program 242 associated with its user device 240, as appropriate.

The runtime application generator 220 suitably interacts with the query generator 214 to efficiently obtain multi-tenant data 232 from the database 230 as needed. In a typical embodiment, the query generator 214 considers the identity of the user requesting a particular function, and then builds and executes queries to the database 230 using system-wide metadata 236, tenant specific metadata 238, pivot tables 234, and/or any other available resources. The query generator 214 in this example therefore maintains security of the common database 230 by ensuring that queries are consistent with access privileges granted to the user that initiated the request.

The data processing engine 212 performs bulk processing operations on the data 232 such as uploads or downloads, updates, online transaction processing, and/or the like. In many embodiments, less urgent bulk processing of the data 232 can be scheduled to occur as processing resources become available, thereby giving priority to more urgent data processing by the query generator 214, the search engine 216, the virtual applications 228, etc. In certain embodiments, the data processing engine 212 and the processor 205 cooperate in an appropriate manner to perform and manage the various techniques, processes, and methods described below.

In operation, developers use the application platform 210 to create data-driven virtual applications 228 for the tenants that they support. Such virtual applications 228 may make use of interface features such as tenant-specific screens 224, universal screens 222 or the like. Any number of tenant-specific and/or universal objects 226 may also be available for integration into tenant-developed virtual applications 228. The data 232 associated with each virtual application 228 is provided to the database 230, as appropriate, and stored until it is requested or is otherwise needed, along with the metadata 238 that describes the particular features (e.g., reports, tables, functions, etc.) of that particular tenant-specific virtual application 228. For example, a virtual application 228 may include a number of objects 226 accessible to a tenant, wherein for each object 226 accessible to the tenant, information pertaining to its object type along with values for various fields associated with that respective object type are maintained as metadata 238 in the database 230. In this regard, the object type defines the structure (e.g., the formatting, functions and other constructs) of each respective object 226 and the various fields associated therewith. In an exemplary embodiment, each object type includes one or more fields for indicating the relationship of a respective object of that object type to one or more objects of a different object type (e.g., master-detail, lookup relationships, or the like).

Still referring to FIG. 2, the data and services provided by the server 202 can be retrieved using any sort of personal computer, mobile telephone, portable device, tablet computer, or other network-enabled user device 240 that communicates via the network 245. Typically, the user operates a conventional browser or other client program 242 to contact the server 202 via the network 245 using, for example, the hypertext transport protocol (HTTP) or the like. The user typically authenticates his or her identity to the server 202 to obtain a session identifier (SessionID) that identifies the user in subsequent communications with the server 202. When the identified user requests access to a virtual application 228, the runtime application generator 220 suitably creates the application at run time based upon the metadata 238, as appropriate. The query generator 214 suitably obtains the requested data 232 from the database 230 as needed to populate the tables, reports or other features of the particular virtual application 228. As noted above, the virtual application 228 may contain Java, ActiveX, or other content that can be presented using conventional client software running on the user device 240; other embodiments may simply provide dynamic web or other content that can be presented and viewed by the user, as desired.

Figure 3:
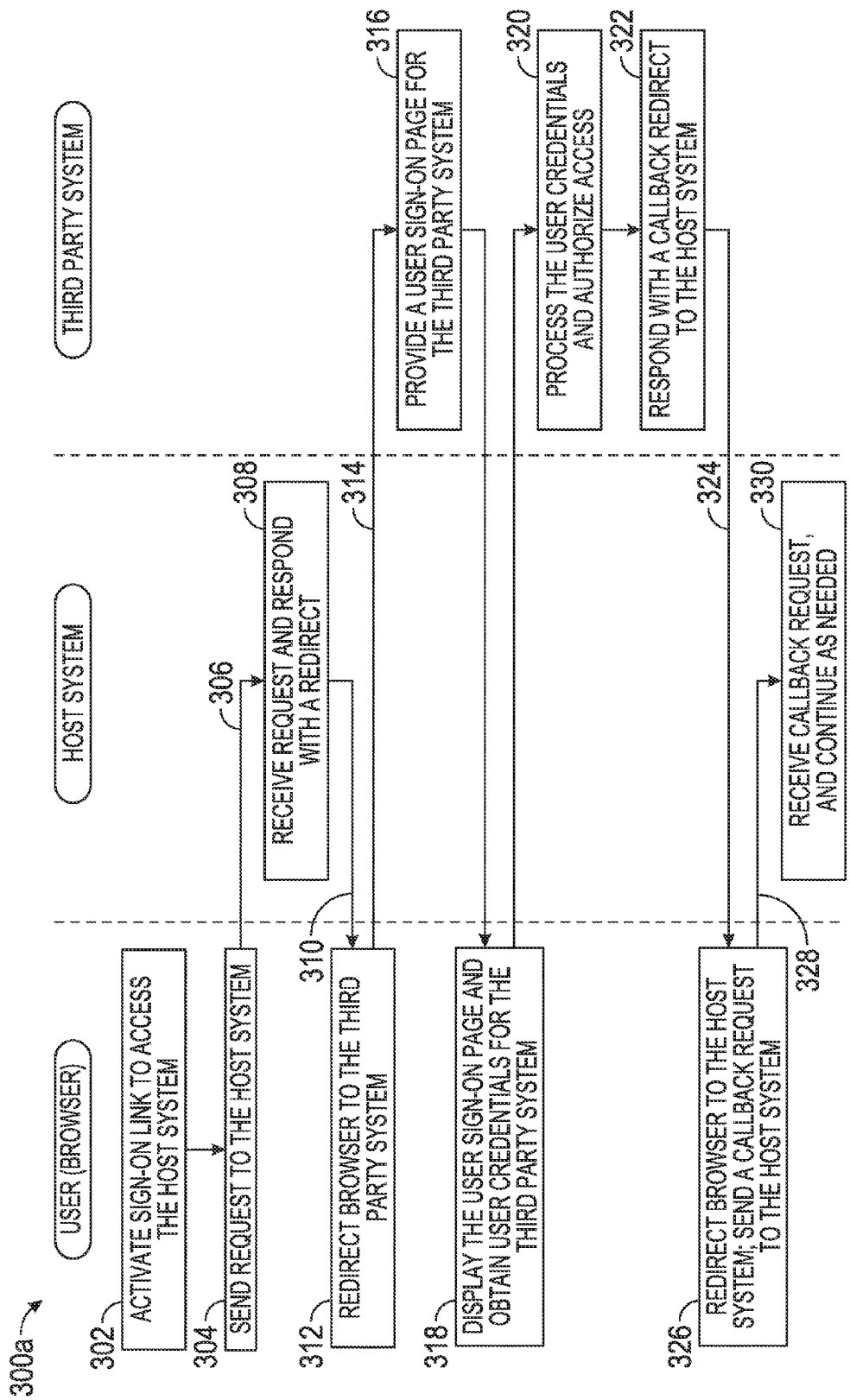
FIG. 3 is a flow chart that illustrates an embodiment of an initial portion of an authentication process that involves a client device, a host system, and a third party system.

FIG. 3 is a flow chart that illustrates an embodiment of an initial portion 300a of an authentication process 300 that involves a client or user device with a browser, a host system, and a third party system. The process 300 represents one exemplary embodiment of a method for logging a user into an online host system with the cooperation of a third party system. The following description of the process 300 assumes that one or more authentication providers (see FIG. 1) have already been configured and deployed at the host system. More specifically, at least one authentication provider for the third party system shown in FIG. 3 has already been configured and deployed for purposes of supporting the process 300. The various tasks performed in connection with the process 300 may be performed by software, hardware, firmware, or any combination thereof. For illustrative purposes, the following description of the process 300 may refer to elements mentioned above in connection with FIGS. 1 and 2. In practice, portions of the process 300 may be performed by different elements of the described system, e.g., the host system, the client device, the third party system, or any processing module thereof. To this end, FIG. 3 and FIG. 4 are sectioned to indicate certain tasks that are typically performed by the client device or web browser (shown to the left), the host system (shown in the center), and the third party system (shown to the right).

It should be appreciated that the process 300 may include any number of additional or alternative tasks, the tasks shown in FIG. 3 need not be performed in the illustrated order, and the process 300 may be incorporated into a more comprehensive procedure or process having additional functionality not described in detail herein. Moreover, one or more of the tasks shown in FIG. 3 could be omitted from an embodiment of the process 300 as long as the intended overall functionality remains intact.

The illustrated embodiment of the process 300 begins with the activation or selection of a sign-on link, button, or any equivalent GUI element rendered by the web browser application of the client device (task 302). For example, the user's browser may display a user-selectable GUI element labeled "Log Into Host System" that, when activated, causes the process 300 to access the host system. Activation of the sign-on link causes the user's web browser to send an appropriate login request to the host system (task 304). Although not always required or applicable in all situations, this example assumes that the login request 306 is generated and sent at a time when the user is not logged into the host system. Thus, the user may be viewing a web page (such as an online resource maintained by or otherwise associated with the third party system, a web page provided by an "unaffiliated" third party system, a portal page provided by the web browser application itself, or the like), where the web page includes a user-selectable sign-on button to enable the user to log into the host system from the currently displayed web page.

In accordance with one particular embodiment, the login request 306 is realized as a GET request that is directed to and identifies the host system. The GET request includes information such as an identifier for the authentication provider. The GET request includes enough information such that the host system can identify which third party to use. Additionally, if the host system partitions users (which might occur in a multi-tenant database system), the GET request will also include information that the host system can use to identity the target partition (organization or tenant) so that future steps that involve user creation or authentication can determine where to "find" the user. This also assumes that the mapping from a third party username to a user in the host system is unique. If not, additional data can be included in the GET request such that the host system can resolve from a third party username into a user in the host system. Note that for the example described here, the identifier of the authentication provider is sufficient because the system forces a unique mapping for each third party username per authentication provider.

This example assumes that the host system receives the login request 306 from the web browser application of the client device at a time when the user is not logged into the host system. The host system recognizes the login request 306 as a request to log the user into the host system and, in response to the login request 306, initiates a single sign-on routine that involves the online third party system. In this regard, the host system attempts to redirect the web browser application to the third party system for authentication. More specifically, the host system may receive the login request 306 and respond with a redirect to the client device (task 308). This example assumes that the redirect 310 is received by the client device such that the web browser is redirected to the third party system (task 312). Task 312 may involve the sending of a suitable request 314 to the third party system, as depicted in FIG. 3. This request 314 informs the third party system that a user, a system, or some entity needs to log into the third party system.

This example assumes that the user of the client device is a registered user of the third party system. This example also assumes that the user is not currently logged into the third party system. Accordingly, the third party system receives the request 314 and initiates a user authentication procedure in response to the request 314. In other words, the third party system proceeds with a login routine for the user. To this end, the third party system may provide a suitably configured user sign-on page to the web browser application (task 316). The client device displays the user sign-on page, which may contain data entry fields to obtain user credentials for the third party system (task 318). This description assumes that the user of the client device enters his or her user credentials for the third party system into the sign-on page and sends the credentials back to the third party system. Upon receipt of the user credentials, the third party system processes the credentials and authorizes (or denies) access in accordance with whatever authentication methodology has been deployed (task 320). This example assumes that the user has entered valid credentials for the third party system, and that the third party system authorizes/authenticates the user. Thereafter, the third party system responds to the client device in an appropriate manner. For example, the third party system may respond with a callback redirect that is directed to the host system (task 322). The callback redirect 324 is communicated from the third party system to the client device, as depicted in FIG. 3.

It should be appreciated that an abbreviated version of the flow depicted in FIG. 3 could be implemented to contemplate a scenario where the user is currently logged into the third party system. Thus, if the user is already logged into the third party system, the request 314 may simply cause the third party system to respond with the callback redirect 324 after confirming that the user is indeed logged in. In other words, task 316 and task 320 may be bypassed when the user is already logged into the third party system.

The callback redirect 324 effectively "bridges" the third party and the host system. Upon receipt of the callback redirect 324 at the client device, the web browser application is redirected to the host system (task 326). More specifically, the callback redirect 324 redirects the user browser back to an endpoint in the host system, which allows the host system to continue the flow. The redirection may be associated with the generation and sending of a callback request 328 to the host system. In accordance with one particular embodiment, the callback request 328 is realized as a GET request that includes a callback intended for the host system. Thus, the third party system initiates the generation of the callback after logging the user in (or when the user is confirmed to be logged into the third party system). This example assumes that the callback request 328 is successfully received by the host system (task 330). This allows the host system to execute the callback in an appropriate manner (i.e., continue as defined or instructed by the received callback). In practice, therefore, the callback can be utilized to carry out different flows or functions after completing the initial portion 300a of the process 300 (e.g., test or diagnostic flows; a single sign-on flow; or the like).

FIG. 4 is a flow chart that illustrates an embodiment of a follow-on portion 300b of the process 300. The follow-on portion 300b assumes that the received callback is associated with a single sign-on flow that is intended to log the user into the host system via the user's third party system credentials and, ideally, in the absence of any user-entered credentials for the host system. The illustrated embodiment processes the received callback and sends a suitably formatted token request to the third party system (task 334). In accordance with one particular embodiment, the token request 336 is realized as a POST request that is directed to and identifies the third party system. The content of the POST request is similar to that described above for the login request 306. For this embodiment, the POST request also includes some type of "token" that can (eventually) be used to access third party data. The easiest way to accomplish this is by saving the relevant information as an opaque "state" parameter that is sent to the third party system earlier in the flow (for example, with the request 314). The third party system can return this state parameter during task (for example, with the callback redirect 324) along with a token to be used by the user system for data access.

This example assumes that the third party system receives the token request and responds by generating or retrieving at least one authentication token (task 338). In certain implementations, task 338 is performed to send a response 340 to the host system, where the response includes at least an OAuth token and a refresh token. The response and the at least one authentication token (hereinafter simply referred to in the plural form "tokens") are received by the host system (task 342), which in turn uses the authentication tokens to request third party user data from the third party system (task 344).

It should be appreciated that task 340 may be optional, depending on the implementation. The general goal of tasks 334 through 344 is to obtain a token to access data in the third party system. If the third party system returns this access token directly during task 324 (and this access token is thereafter provided to the host system via the callback request 328 or some other mechanism), then these additional steps are unnecessary. Thus, after task 342, the host system is able to identify the third party system and the host system also has a token to access data from that third party system. Moreover, the host system will have enough data to identify the host system target partition, such as a specific organization or tenant, if applicable.

In certain exemplary embodiments, task 344 is performed to send a suitably formatted data request 346 to the third party system, where the data request 346 includes the authentication tokens received by the host system during task 342. The data request 346 represents a request to obtain some user data that is maintained by the third party system (i.e., third party data for the user). This description assumes that the third party system receives the data request 346 and the authentication tokens, extracts the tokens, and validates the tokens to confirm that the host system is indeed trustworthy (task 348). If the tokens are valid, the third party system may take appropriate action to process the data request and access, retrieve, or otherwise obtain the requested third party user data. The obtained third party user data can then be sent to the requesting host system (task 350). As explained previously, the obtained third party user data is associated with the user of the client device and is maintained and updated by the online third party system. The third party user data may be provided with a suitably formatted response 352 communicated from the third party system to the host system.

The illustrated embodiment of the process 300 assumes that the host system receives the response 352 and processes the third party user data in an appropriate manner (task 354). As described in more detail below with reference to FIG. 5, task 354 may create, update, or modify: host system records maintained by the online host system; host system user data; and/or other data objects in accordance with (or otherwise in response to) the obtained third party user data. After processing the third party user data in the desired manner, the process 300 may continue by automatically logging the user into the host system (task 356), generating a host system session for the logged-in user (task 358), and sending an appropriate redirect to the web browser application of the client device (task 360). Notably, task 356 logs the user into the host system without prompting for or otherwise obtaining the user's credentials for the host system. In this context, the process 300 performs a single sign-on routine that logs the user into the host system via authentication at the third party system.

Task 360 is performed to redirect the web browser application to a page or a resource that is maintained and provided by the host system. Accordingly, the web browser application of the client device may respond by displaying a web page for the host system, providing a document accessed via the host system, or the like (task 362). Thus, the process 300 can be performed to take the user from any webpage displaying a sign-on element for the host system, direct the user to the third party system for purposes of authentication, and then automatically direct the user to a webpage associated with the host system.

As mentioned above, task 354 is associated with the handling of the received third party user data. The specific way in which the third party user data is handled may vary from one embodiment to another, from one application to another, from one authentication provider to another, and the like. In this regard, FIG. 5 is a flow chart that illustrates an embodiment of third party user data processing, which may take place during task 354 of the process 300. For this particular embodiment, the host system receives the third party user data from the third party system (task 370), and analyzes at least some of the received third party user data (task 372) to determine whether or not the third party user data (and, therefore, the user) is mapped to an existing user of the host system (query task 374). As mentioned previously, the third party user data under analysis may include at least one (and typically more than one) of the following data: profile information for the user; a username of the user; a password of the user; an image that represents the user; a name of the user; biographical information of the user; an email address of the user; a telephone number of the user; a physical address of the user; a facsimile number of the user; a location associated with the user; a title of the user; a department associated with the user; a company name associated with the user; the user's locale and language settings; endpoint URLs for retrieving additional information about the user; and information related to user access privileges. In practice, therefore, the host system also utilizes some of this user data as identifying information that is associated with the particular user. Accordingly, if query task 374 finds at least a threshold amount of "matching" or "similar" data in the host system records, then the process 300 can safely assume that the received third party user data points to an existing user of the host system. Otherwise, the process 300 assumes that the user is not currently registered with the host system.

If query task 374 determines that the obtained third party user data is mapped to an existing user of the host system (the "Yes" branch of query task 374), then the process 300 may continue by identifying or accessing one or more existing host system records associated with the existing user (task 376). For example, the existing host system records may relate to the user's profile data, user preference data, user configuration data, contacts list, friends list, or the like. The process 300 may continue by modifying (e.g., updating) the existing host system records with at least some of the obtained third party user data (task 378). If, for instance, the received third party user data includes a different email address or telephone number for the user, then task 378 might update the host system records for consistency with the email address and telephone number provided by the third party system. After updating the host system records, the flow depicted in FIG. 5 exits and the process 300 continues to task 356 shown in FIG. 4.

On the other hand, if query task 374 determines that the obtained third party user data is not mapped to any existing user of the online host system (the "No" branch of query task 374), then the process 300 may continue by creating a new user profile and/or a set of new user records to register the user with the host system (task 380). In this regard, the process 300 may create at least one new host system record that is linked to the newly created user profile, and then populate the new host system record(s) with at least some of the obtained third party user data (task 382). In other words, the host system creates the new user profile by leveraging the user data maintained and provided by the third party system. After populating the new host system records, the flow depicted in FIG. 5 exits and the process 300 continues to task 356 shown in FIG. 4. It should be appreciated that the process 300 effectively links the the user's third party profile or identity (along with user data associated with the third party system) to the same user's data model maintained by the host system.

In some embodiments, the online host system is realized as one tenant of a multi-tenant database system, e.g., a CRM system that supports a plurality of different entities, organizations, tenants, businesses, or the like. In a CRM system environment, the host system records may include CRM data records and, therefore, the data modifying tasks described above may be associated with the creation or updating of CRM data records in accordance with the obtained third party user data. Of course, the particular type and format of the data handled by the process 300 can vary from one deployment to another.

Referring again to FIG. 1, the host system 104 preferably includes an authentication provider 114 for each third party system 106 that is able to participate in the single sign-on and third party user data exchange techniques described here. In practice, a system administrator for the host system 104 can create and configure the authentication providers 114 to provide the desired feature set and functionality. In preferred embodiments, the framework for the creation and customization of the authentication providers 114 allows the system administrator to write software plug-in modules to achieve the desired functionality for each authentication provider 114. Accordingly, the system 100 can be suitably configured to accommodate the quick and easy deployment of authentication providers 114 as needed to support additional third party systems if so desired by the host system 104.

The flexible and customizable nature of the system 100 allows each authentication provider 114 to be deployed in an individualized manner that defines exactly how the host system and the third party system interact with one another, the type of third party user data that is handled, the manner in which the host system processes the third party user data, and the like. Customizability could include, for example: writing custom audit data to the host system when users log in through the authentication provider; performing callouts to external services to possibly provision users on other systems when a user is created; or the like.

The framework also allows customization at a "finer" level of detail, such as choosing which third party data field is used to update the user's name in the host system, or deciding whether or not to update the user's phone number. In particular, this customizable nature allows a host system administrator to limit access to certain third party users (by checking username, email address, or the like), determine what privileges the user should have in the host system from the third party data, or the like. Further customizability includes the ability to fetch even more information from the third party system. For example, if using FACEBOOK as the third party, the system could be customized and configured to fetch a list of the user's friends, find equivalent users in the host system, and associate the accounts such as automatically following them in an internal social networking application maintained by the host system. Moreover, the framework can be designed in a generalized manner to allow it to be reused for other purposes, such as simply obtaining access tokens or user information.

An authentication provider can be created as needed to allow organizations to define which third party providers they want to support. In certain implementations, a number of popular, common, or highly relevant third party systems or providers are predefined (e.g., FACEBOOK, TWITTER, etc.). These predefined third party systems may be listed in a suitable GUI element such as a dropdown list. Thus, when a predefined third party provider is selected, the provider's required fields are shown to the host system administrator. For example, if the administrator creates an authentication provider for FACEBOOK, the system will ask for a client ID and a client secret because the FACEBOOK system calls for those attributes. On the other hand, creation of an authentication provider for the GOOGLE system requires no additional details. After an authentication provider is created and deployed, the end users of the host system can configure the single sign-on feature described above to enable logging into the host system using the credentials corresponding to the third party system.

The foregoing detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, or detailed description.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

The foregoing detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, or detailed description.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. The program or code segments can be stored in a tangible non-transitory processor-readable medium in certain embodiments. The "processor-readable medium" or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, or the like.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method for logging a user into an online host system, the method comprising:
   receiving a login request from a web browser application of a client device, wherein the login request identifies the online host system;
   in response to receiving the login request, initiating a single sign-on routine that involves an online third party system;
   thereafter, obtaining third party user data from the online third party system, wherein the obtained third party user data is associated with the user and is maintained by the online third party system;
   determining that the obtained third party user data is not mapped to any existing user of the online host system;
   modifying, at the online host system in accordance with the obtained third party user data, host system records maintained by the online host system, wherein the modifying comprises: in response to the determining that the obtained third party user data is not mapped to any existing user of the online host system, creating a new user profile for the online host system, creating a new host system record linked to the new user profile, and populating the new host system record with at least some of the obtained third party user data; and
   thereafter, automatically logging the user into the online host system.

2. The method of claim 1, wherein automatically logging the user into the online host system is performed in the absence of any user-entered credentials for the online host system.

3. The method of claim 1, further comprising:
   generating a host system session for the user after automatically logging the user into the online host system; and
   sending a redirect to the web browser application of the client device, wherein the redirect identifies a resource maintained and provided by the online host system.

4. The method of claim 1, wherein the login request is received from the web browser application of the client device at a time when the user is not logged into the online host system.

5. The method of claim 1, further comprising:
   sending a token request to the online third party system, wherein sending the token request occurs after initiating the single sign-on routine and before obtaining the third party user data;
   in response to sending the token request, receiving an authentication token from the online third party system; and
   thereafter, sending a data request for the third party user data to the online third party system, wherein the data request includes the received authentication token.

6. The method of claim 1, wherein the third party user data comprises at least one of: profile information for the user; a username of the user; a password of the user; an image that represents the user; a name of the user; biographical information of the user; an email address of the user; a telephone number of the user; a physical address of the user; a facsimile number of the user; a location associated with the user; a title of the user; a department associated with the user; a company name associated with the user; a locale setting of the user; a language setting of the user; an endpoint URL for retrieving additional information about the user; and information related to user access privileges.

7. The method of claim 1, wherein:
the online host system comprises a customer relationship management (CRM) system;
the host system records comprise CRM data records; and
the modifying comprises updating at least one of the CRM data records with the obtained third party user data.

8. The method of claim 1, further comprising:
determining that the obtained third party user data is mapped to an existing user of the online host system; and
in response to the determining, identifying at least one existing host system record associated with the existing user of the online host system;
wherein the modifying comprises updating the at least one existing host system record with at least some of the obtained third party user data.

9. A non-transitory computer-readable storage medium with executable instructions stored thereon, wherein the executable instructions instruct a processor to perform a method comprising:
receiving a login request to log a user into an online host system;
in response to receiving the login request, sending a token request to an online third party system;
in response to sending the token request, receiving an authentication token from the online third party system;
using the received authentication token to obtain third party user data from the online third party system, wherein the obtained third party user data is associated with the user and is maintained by the online third party system;
determining that the obtained third party user data is not mapped to any existing user of the online host system; and
in response to the determining that the obtained third party user data is not mapped, creating, at the online host system, a new user profile for the online host system, the new user profile being linked to the user, creating a new host system record linked to the new user profile, and populating the new host system record with at least some of the obtained third party user data.

10. The computer-readable storage medium of claim 9, wherein the online host system comprises a customer relationship management (CRM) system; and the new host system record comprises a CRM data record for the user.

11. The computer-readable storage medium of claim 9, wherein the method further comprises: logging the user into the online host system after creating the new host system record.

12. The computer-readable storage medium of claim 9, wherein the method further comprises:
initiating a single sign-on routine to log the user into the online third party system, wherein the initiating occurs after receiving the login request and before sending the token request.

13. The computer-readable storage medium of claim 9, wherein the third party user data comprises at least one of: profile information for the user; a username of the user; a password of the user; an image that represents the user; a name of the user; biographical information of the user; an email address of the user; a telephone number of the user; a physical address of the user; a facsimile number of the user; a location associated with the user; a title of the user; a department associated with the user; a company name associated with the user; a locale setting of the user; a language setting of the user; an endpoint URL for retrieving additional information about the user; and information related to user access privileges.

14. A method for logging a user into an online host system, the method comprising:
receiving a login request from a web browser application of a client device, wherein the login request identifies the online host system;
in response to receiving the login request, redirecting the web browser application to an online third party system;
thereafter, receiving a callback from the web browser application;
in response to receiving the callback, obtaining third party user data from the online third party system, wherein the obtained third party user data is associated with the user and is maintained by the online third party system;
when the obtained third party user data is mapped to an existing user of the online host system, identifying, at the online host system, an existing host system record associated with the existing user and updating, at the online host system, the identified existing host system record in accordance with the obtained third party user data;
when the obtained third party user data is not mapped to any existing user of the online host system, creating, at the online host system, a new user profile for the user, creating, at the online host system, a new host system record associated with the new user profile, and populating, at the online host system, the new host system record with at least some of the obtained third party user data; and
thereafter, automatically logging the user into the online host system.

15. The method of claim 14, further comprising:
generating a host system session for the user after automatically logging the user into the online host system; and
redirecting the web browser application to a resource maintained and provided by the online host system.

16. The method of claim 14, further comprising:
sending a token request to the online third party system, wherein sending the token request occurs in response to receiving the callback and before obtaining the third party user data;
in response to sending the token request, receiving an authentication token from the online third party system; and
thereafter, sending a data request for the third party user data to the online third party system, wherein the data request includes the received authentication token.

17. The method of claim 14, wherein the online host system comprises one of a plurality of tenants supported by a multi-tenant database system.

18. The method of claim 14, wherein the online third party system initiates generation of the callback when the user is logged into the online third party system.

* * * * *